3,483,033
Patented Dec. 9, 1969

3,483,033
EVAPORATOR SCALE PREVENTION IN SUGAR MANUFACTURE
John A. Casey, Pepper Pike, Ohio
(2804 Brainard Road, Cleveland, Ohio 44124)
No Drawing. Filed Aug. 23, 1966, Ser. No. 574,299
Int. Cl. C13f 1/02
U.S. Cl. 127—61                                           7 Claims

ABSTRACT OF THE DISCLOSURE

In the production of cane and beet sugar, the formation of scale deposits in the evaporators in which the raw sugar juice is concentrated is minimized by the addition to the raw sugar juice of a composition containing an hydrolyzed polyacrylamide and a protective colloid such as sodium alginate or carbormethyl-cellulose. Other materials such as ethylenediaminetetraacetic, a gluconate and a polyphosphate may be included in the composition.

---

This invention relates to the production of cane and beet sugar and especially to a method and composition for minimizing the formation of scale deposits during evaporation of the raw juices and for increasing the sugar yield in the case of cane and beet sugar extraction.

More particularly, the invention relates to an improved method and composition adapted to inhibit the precipitation of calcium and other polyvalent salts in the evaporators in which the raw juice is concentrated, and for providing a protective film around those precipitates that do form to prevent the formation of scale therefrom.

For the sake of economy, it is desirable that sugar mills be kept in continuous operation for as long as possible, that the shutdowns necessary for cleaning be as short as possible, and that a maximum quantity of sugar be extracted from the raw juice.

In a typical sugar mill, the juice is first extracted from the cane by grinding. Lime is then added to the raw juice to control the pH after which the juice is heated and sent to a clarifier in which the precipitates formed by the action of heat and lime are eliminated to as great a degree as possible. The clarified juice then travels to a series of evaporators or to a multiple effect evaporator where it is concentrated from an entering sugar concentration of about 15 or 16 percent to a final sugar concentration of about 65 percent. The syrup from the evaporators proceeds to vacuum pans where further evaporation is accomplished by boiling the syrup under reduced pressure. The evaporation continues until the syrup becomes saturated with sugar after which the sugar is seeded to initiate crystal growth. When the evaporator pan has been filled with a dense mixture of crystals and syrup, known as "massecuite," the contents of the pan, called a "strike," are discharged, and the massecuite is centrifuged to separate the sugar crystals from the molasses. Normally strikes are discharged during three successive stages wherein the remaining molasses passes to three separate pans.

Initially the raw juice contains varying amounts of scale forming products such as calcium and magnesium which determine what is referred to as juice "hardness." A hardness ranging from 400 to 2500 parts per million, in terms of equivalent $CaCO_3$, based on initial juice weight is common.

These products have an undesirable influence during the evaporation and crystallization stages of the sugar manufacturing process. The calcium salts such as calcium sulfate, calcium phosphate, calcium oxalate, calcium silicate and others, many of which have inverse solubility characteristics, precipitate out on the evaporator heating surfaces causing the formation of heavy scale which severely reduces evaporator efficiency.

As the salts are baked out on the surface of the evaporator tubes, they usually occlude varying amounts of other insoluble impurities such as silicates and various organic products.

During the crystallization phase, the calcium and magnesium salts generally cause a loss of sugar at least equal to their weight in the molasses due to the dissolved sugar which remains in the volume of water required to maintain the molasses in a pumpable form. More importantly it is believed that the calcium and magnesium tend to form complex molecules together with the sucrose to further reduce the extraction of sugar from the molasses.

Several additives have been utilized in an attempt to reduce the formation of evaporator scale with varying degrees of success. Chelating agents such as ethylenediaminetetraacetic acid (EDTA) have been used to inhibit the precipitation of calcium salts; however, the amount must be in stoichiometric proportion to the calcium present so that the ultimate cost is excessive.

Polyphosphates have also been used to inhibit calcium precipitation; however, here again large proportional amounts are required. More seriously, within hours after the addition of polyphosphates, large amounts of flocculent tricalciumphosphate precipitate causing serious problems during the crystallization operation.

To effectively control or prevent the encrustation of the juice evaporators, the chemical formula of an effective additive must be able to accommodate a wide variation in the relative amount of the scale forming impurities. For example, analyses of encrustation in sugar juice evaporators indicate variations at least within the following ranges for specific components of evaporation encrustation.

| Scale component: | Variation in percent |
|---|---|
| CaO | 1 to 40 |
| $SO_3$ | 1 to 50 |
| $P_2O_5$ | 1 to 45 |
| $SiO_2$ | 1 to 70 |

An analysis of a common encrustation is as follows:

| Scale component: | Amount in percent |
|---|---|
| CaO | 20 |
| $SO_3$ | 30 |
| $P_2O_5$ | 5 |
| $SiO_2$ | 20 |
| Other | 25 |

The present invention provides a novel method and composition which substantially reduces the formation of evaporator scale without producing adverse secondary effects. At the same time, the sugar extraction is significantly increased. The composition includes ingredients, some of which have been used separately in the prior art, which when used according to the invention act in a synergistic manner to provide unexpected results.

The preferred composition comprises a hydrolyzed polyacrylamide, a protective colloid such as sodium alginate or carboxymethylcellulose and preferably one or more other ingredients selected from the following:

(1) EDTA such as for example ethylenediaminetetraacetic acid or disodiumethylenediaminetetraacetic dihydrate.

(2) A gluconate such as for example sodium-gluconate or sodium gluco-heptonate.

(3) A polyphosphate such as tripolyphosphate or sodium hexametaphosphate.

The preferred proportions of the various ingredients based on 100 parts by weight of the composition generally range from 10–15 parts by weight of the hydrolyzed polyacrylamide, from 10–25 parts by weight of the protective colloid, from 7–15 parts by weight of EDTA, from 7–15 parts by weight of a gluconate, and from 40–70 parts by weight of a polyphosphate.

According to the method of the invention, the above composition is added to the sugar juices after the clarification phase of the sugar manufacturing process and before the juices enter the first evaporator. The amount used ranges from about 3 to about 30 parts per million based on juice weight. According to an alternate practice of the method, an additional amount of the composition is added just before the juices enter the last evaporator body. Other additions may of course be made if desired within the scope and spirit of the invention, the principal consideration being that most evaporator scale occurs at the last stage in the sugar concentration process.

The hydrolyzed polyacrylamide in the composition acts as a crystal habit modifier and serves to increase the solubility of the calcium salts in the sugar juices and thus inhibit precipitation during the evaporation step. The use of hydrolyzed acrylamides in preventing boiler scale is discussed in detail in United States Patent No. 2,783,200. Generally the polymer chain structure comprises units having the formula:

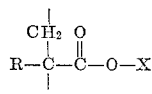

where R is either H or $CH_3$, and X is either H, Na, K or $NH_3$. In prior art applications, however, a .3 to 20 p.p.m. concentration has been used, while according to the present invention, only from .2 to 3 p.p.m. are used due to the synergistic effect achieved through the cooperation of the other ingredient or ingredients.

The colloid, such as for example sodium alginate or carboxymethylcellulose, is a gum which forms a coating around such precipitates that do form and minimizes the tendency of precipitates to stick to the evaporator coils. Thus the colloid cooperates with the acrylic polymer and other ingredients in a synergistic maner to reduce the accumulation of scale. A .2 to 3.0 p.p.m. concentration of the protective colloid in the raw sugar juice has been found effective to achieve optimum results.

Another characteristic of the protective colloid is that it adds to the synergistic results by reducing the tendency of colloids (both organic and inorganic) originally present in the clarified juice from baking on the hot heat transfer surfaces or from being occluded in the precipitation of calcium salts on such surfaces. Also, the protective colloids would appear to further benefit the system by minimizing the formation of encrustation by whatever calcium salts do precipitate despite the effect of the sequestering formation.

A particularly suitable protective colloid adapted for use in the composition of the invention is sodium alginate which is commercially available under the trade designation "Halltex" from Stein, Hall & Co., Inc., 605 3rd Ave., New York, N.Y.

Another suitable colloid is carboxymethylcellulose (CMC) which is discussed in United States Patent No. 2,970,959 with respect to inhibiting the formation of calcium sulfate scale in oil. The prior art, however, calls for concentration of from 3 to 30 p.p.m. to achieve suitable results. Two particularly suitable CMC products are sold by E. I. du Pont de Nemours & Company under the trade designation "T-75-L" and "T-75-XL." These products are semirefined granular powders formed by the reaction of soda cellulose wtih monochloroacetic acid.

Other suitable colloids include a mannogalactan extracted from leguminous seeds sold under the trade designation "V-7-E" by The Burtonite Company of Nutley, N.J., and protein colloids extracted from collagen and sold in granulated form under the trade designation "5-V" by Swift & Company of Chicago, Ill.

EDTA is a generic expression for compounds in the group including ethylenediaminetetraacetic acid and disodiumethylenediaminetetraacetate dihydrate. It is essentially a chelating agent which due to its two valances attaches itself to metallic molecules to form heterocyclic molecules. Accordingly, the chelation inhibits precipitation of the salts. Concentrations of from 1. to 1 p.p.m. in the sugar juice provide optimum results. While desirable in many instances, the EDTA is not essential to deriving the advantages of the invention.

Another pertinent characteristic of the EDTA is that it retards the hydrolysis of the polyphosphate in the composition. This increases the solubility of the calcium salts in the sugar juice by rendering the polyphosphate more effective as well as through the chelating effect of the EDTA itself.

A particularly suitable form of EDTA is commercially available under the trade designations "Sequestrene AA" and "Sequestrene NA2" from Geigy Chemical Corporation of Ardsley, N.Y. Another suitable form is commercially available under the trade designation "Hamp-Ene 100" from Hampshire Chemical Corporation of Nashua, N.H.

The polyphosphate comprises a major portion of the weight of the composition and is particularly intended to prevent the precipitation of calcium salts. Sodium tripolyphosphate and sodium hexametaphosphate are particularly suitable. Concentrations of from 2 to 5 p.p.m. are generally sufficient.

The sodium gluconate retards precipitation of calcium salts and is needed only in relatively small amounts. While not essential in many instances, it is particularly desirable in certain cases where relatively large amounts of calcium are present.

A principal advantage of the composition of the invention is its flexibility and adaptability to wide variations in the amounts of the different scale forming impurities in the raw sugar juice.

The invention will be better understood by referring to the following examples.

EXAMPLE A

A composition was prepared according to the invention utilizing the following recipe.

| Ingredient: | Proportion, percent |
|---|---|
| "Cyanamer P35" (a polyacrylamide of relatively low molecular weight) | 10 |
| Sodium alginate | 10 |
| EDTA (ethylenediaminetetraacetic acid) | 5 |
| Sodium hexametaphosphate | 70 |
| Sodium gluconate | 5 |

In the above formulation, the "Cyanamer P35" is available from American Cyanamid Company and is discussed in detail in United States Patent No. 2,783,200. The sodium alginate is sold commercially under the trade designation "Halltex." The EDTA is also commercially available and is sold under the trade designation "Sequestrene AA."

A 5% by weight water solution of the above composition was prepared and stirred for about 2 hours to assure complete dissolution. The solution was then added to the raw sugar juices just before the juices entered the first evaporator.

Six test runs were made, two of which were without the addition of the composition and the other four of which were made with the addition of the composition in an amount of about 4 parts per million of clarified juice as shown in Table I below.

TABLE I

| | Run No. | | | | | |
|---|---|---|---|---|---|---|
| | 1 | 2 | 3 | 4 | 5 | 6 |
| Tons cane ground | 24,770 | 26,400 | 25,520 | 12,820 | 28,980 | |
| Tons cane per hour | 91.04 | 93.92 | 91.17 | 97.12 | 104.62 | |
| P.p.m. of additive on cane wt | 0 | 0 | 4.2 | 3.8 | 4.9 | 4.0 |
| Total hours continuous grinding | 196.27 | 272.08 | 281.09 | 279.09 | 131.91 | 277 |
| Evaporation rate, lbs. H²O/hr./ft.² | 6.94 | 7.16 | 7.04 | 7.10 | 7.34 | 7.55 |
| Clarified juice brix | 14.20 | 14.65 | 15.30 | 15.68 | 16.39 | 16.63 |
| Syrup brix | 58.29 | 61.71 | 59.42 | 62.54 | 64.48 | 63.35 |
| POL in sugar, percent | 88.02 | 88.31 | 88.28 | 88.75 | 89.47 | 89.26 |
| POL in final molasses, percent | 9.85 | 9.76 | 9.63 | 9.16 | 8.71 | 8.61 |
| POL in filter cake, percent | .40 | .36 | .35 | .33 | .34 | .35 |
| Undetermined, percent | 1.69 | 1.57 | 1.74 | 1.76 | 1.40 | 1.78 |
| POL in juice, percent | 100 | 100 | 100 | 100 | 100 | 100 |

In Table I, "Brix" is used to indicate a measurement taken on an arbitrary hydrometer scale for expressing the specific gravity of sugar solutions according to the formula:

$$\text{specific gravity} = \frac{400}{400+n} \text{ at } 15.6° \text{ C}$$

where $n$ represents the reading on the scale.

The expression "POL" is used to indicate the percentage of the total available sugar occurring in the output product of the various stages of the extraction process. The percentage is based on the total quantity of sugar initially available in the juice. Accordingly, the POL of the final crystalline product, the molasses and the filter cake are indicated. A high POL for the crystalline product is of course preferred.

After the first two runs without the additive, the evaporators were cleaned by boiling with caustic soda with a sample of the evaporator scale being analyzed. The analysis indicated a composition including 10.26% $SiO_2$, 24.19% CaO, 9.5% $PO_4$ and 5.38% $SO_3$. The remainder of the sample was water and organic matter. The boiling continued for 3 hours and several brush passes were required to remove only 75% of the scale.

Run No. 3, in which the additive was added to the clarified juice prior to its entering the first evaporator body, lasted for two weeks with the cane grinding and sugar extraction continuing without interruption. After completion of the run, the evaporators were again cleaned by boiling in caustic soda and were found to be completely clean after only 2 hours boiling time and one brush pass.

In Run No. 4, a split application of the additive was used, one-half of the total amount being added to the clarified sugar juice and the other half being added through the feed line entering the final evaporator stage. Due to a shortage of material, only 3.8 p.p.m. were used as opposed to the intended 4 p.p.m. This variation, however, had little noticeable effect on the results.

Here again the run was continued for two weeks followed by boiling out of the evaporators with caustic soda. The evaporators were thoroughly clean after only one brush pass.

The same procedure was followed in Runs 5 and 6 with a substantial reduction noted in the formation of boiler scale.

In all runs using the additive, the sucrose recovery was significantly improved as is apparent from the lower POL of the final molasses and the higher POL of the crystalline sucrose as indicated in Table I. Based on prior experience with the same equipment in the absence of the use of the additive according to the invention, it is estimated that approximately one-half of evaporator scale formation was prevented during each of Runs 3, 4, 5 and 6.

EXAMPLE B

A sugar factory was operated on six consecutive days during which data was recorded daily indicating the tons of sugar juice processed per hour, the juice Brix, the syrup Brix, and the evaporation rate in lbs. of water per hour per square foot. Shortly thereafter, the same factory was operated on seven consecutive days in the same manner as before except that the composition of Example A was added to the raw sugar juice by continually metering a solution containing the composition both into the raw juice at a rate of two and one-half parts per million based on the weight of the clarified juice, and to the last evaporator body again at a rate of two and one-half parts per million. The $CaCO_3$ hardness of the clarified juice during both periods of operation averaged 900 parts per million.

The averages for the daily data recorded during each period of operation are indicated below in Table II together with the percent improvement in the various figures derived through the use of the composition according to the invention.

TABLE II

| | Tons, juice/hr. | Juice brix | Syrup brix | Evaporation rate (lbs./hr./ft.²) |
|---|---|---|---|---|
| 1st Run (without composition) | 41.67 | 14.93 | 62.30 | 4.76 |
| 2nd Run (with composition) | 51.27 | 15.02 | 67.35 | 5.99 |
| Percent improvement | 23 | | 8.1 | 25.9 |

The figures clearly indicate the improvement in evaporator efficiency which derived from the use of the composition of the invention.

It has been found that the reduction in the amount of scale formed during the operation of the evaporators, improves steadily as the composition is added to the sugar juice. While the reason for this is unclear, it is believed that the composition in some way causes the interstices in the evaporator surface to be filled with a non-scale forming material so that they no longer provide a good anchoring means for the scale deposits.

Two variations of the composition embodied in the invention, which normally provide advantages equal to those deriving from the formulation of Example A, are listed below:

| | Proportion | |
|---|---|---|
| Ingredient | Formula A | Formula B |
| "Cyanamer P35" | 30 | 25 |
| Sodium alginate | 20 | 20 |
| EDTA | 10 | 10 |
| Sodium hexametaphosphate | 40 | 35 |
| Sodium gluconate | 0 | 10 |

While the invention has been described and illustrated with respect to specific examples thereof, this is intended for the purpose of illustration rather than limitation and other variations and modifications will become apparent to those skilled in the art within the intended spirit and scope of the invention as described and claimed. I do not want to be limited in the scope and effect of the patent to this preferred form of my invention nor in any other way that is inconsistent with he progress by which the art has been promoted hereby.

I claim:

1. An additive for use in the concentration of sugar juices and the crystallization of sugar therefrom comprising, based on one hundred parts thereof, from 10 to 40 parts by weight of an hydrolyzed polyacrylamide, from 10 to 25 parts by weight of a protective colloid selected from the group consisting of sodium alginate and carboxymethylcellulose, from 7 to 15 parts by weight of ethylenediaminetetraacetic acid and from 40 to 72 parts by weight of a material from the group consisting of tripolyphosphate and sodium hexametaphosphate.

2. An additive for use in the concentration of sugar juices and the crystallization of sugar therefrom comprising, based on 100 parts thereof, about 10 parts by weight of an hydrolyzed polyacrylamide, about 10 parts by weight of sodium alginate, about 5 parts by weight of ethylenediaminetetraacetic acid, about 70 parts by weight of sodium hexametaphosphate and about 5 parts by weight of sodium gluconate.

3. An additive for use in the concentration of sugar juices and the crystallization of sugar therefrom comprising, based on 100 parts thereof, about 30 parts by weight of an hydrolyzed polyacrylamide, about 20 parts by weight of sodium alginate, about 10 parts by weight of ethylenediaminetetraacetic acid, and about 40 parts by weight of sodium hexametaphosphate.

4. An additive for use in the concentration of sugar juices and the crystallization of sugar therefrom comprising, based on 100 parts thereof, about 25 parts by weight of an hydrolyzed polyacrylamide, about 20 parts by weight of sodium alginate, about 10 parts by weight of ethylenediaminetetraacetic acid, about 35 parts by weight of sodium hexametaphosphate and about 10 parts by weight of sodium gluconate.

5. In the process of concentrating sugar juice and crystallizing sugar therefrom, the steps which comprise adding to the sugar juice before the juice enters the evaporator an additive comprising an hydrolyzed polyacrylamide in the range of from about 1 to 4 parts of the polyacrylamide per million parts of sugar juice, a protective colloid from the group consisting of sodium alginate and carboxymethylcellulose in the range of from about one-half to about four parts of colloid per million parts of sugar juice and from about 2 to 40 parts of a material from the group consisting of tripolyphosphate and sodium hexametaphosphate per million parts of sugar juice.

6. In the process of concentrating sugar juice and crystallizing sugar therefrom, the steps which comprise adding to the sugar juice before the juice enters the evaporators an additive comprising an hydrolyzed polyacrylamide in the range of from about 1 to about 4 parts of the polyacrylamide per million parts of juice, and a protective colloid from the group consisting of sodium alginate and carboxymethylcellulose in the range of from about one-half to about 4 parts of the protective colloid per million parts of juice.

7. An additive for use in the concentration of sugar juices and the crystallization of sugar therefrom, containing, as essential ingredients, from 10 to 40 parts by weight of an hydrolyzed polyacrylamide and from 10 to 25 parts by weight of a protective colloid from the group consisting of sodium alginate and corboxymethylcellulose.

References Cited

UNITED STATES PATENTS

| 2,591,704 | 4/1952 | King | 127—58 |
| 2,783,200 | 2/1957 | Crum, et al. | |
| 2,802,788 | 8/1957 | Flaxman | 252—181X |
| 2,970,959 | 2/1961 | Jones | 252—181X |
| 3,061,478 | 10/1962 | Kent | 127—61 |
| 3,217,034 | 11/1965 | Karabinos, et al. | |

FOREIGN PATENTS 846,499   8/1960   Great Britain.

OTHER REFERENCES

Prescott et al. "Gluconic Acid & Its Derivatives" I. & E.C. 45 No. 2, pp. 338–342, February 1953.

"Sodium Alginate as Boiler Compound" Pinnington, Abst. in Int. Sugar J. December 1944, p. 328.

"Sequestrene" ALRO Chem. Co. 1965, pp. 1, 25–27, 35, 43, 50.

MORRIS O. WOLK, Primary Examiner

D. G. CONLIN, Assistant Examiner

U.S. Cl. X.R.

127—58; 210—57, 58; 252—82, 180, 181